United States Patent
Hoshi

(10) Patent No.: US 7,701,818 B2
(45) Date of Patent: Apr. 20, 2010

(54) OPTICAL DISK APPARATUS WITH CONTROLLER FOR CHANGING AN AMOUNT OF LIFTING AND A CONTROL METHOD THEREOF

(75) Inventor: Tomoya Hoshi, Fujisawa (JP)

(73) Assignee: Hitachi-LG Data Storage, Inc. (JP)

( * ) Notice: Subject to any disclaimer, the term of this patent is extended or adjusted under 35 U.S.C. 154(b) by 907 days.

(21) Appl. No.: 11/478,577

(22) Filed: Jul. 3, 2006

(65) Prior Publication Data

US 2007/0064558 A1 Mar. 22, 2007

(30) Foreign Application Priority Data

Sep. 20, 2005 (JP) ............... 2005-271768

(51) Int. Cl.
*G11B 7/005* (2006.01)
*G11B 7/09* (2006.01)
(52) U.S. Cl. ............... 369/47.26; 369/53.28; 369/59.15
(58) Field of Classification Search ... 369/44.25–44.26, 369/44.32–44.33, 47.25–47.27, 53.2–53.23, 369/53.25, 53.28, 53.31–53.36, 59.15–59.18, 369/124.1–124.13
See application file for complete search history.

(56) References Cited

U.S. PATENT DOCUMENTS 5,699,330 A * 12/1997 Ogino et al. ............. 369/44.27
5,848,036 A * 12/1998 Ishibashi et al. ......... 369/44.29
6,028,826 A * 2/2000 Yamamoto et al. ....... 369/44.35
2005/0270916 A1* 12/2005 Maeda ..................... 369/44.25

FOREIGN PATENT DOCUMENTS

| JP | 61-050222 | 3/1986 |
| JP | 05-062219 | 3/1993 |
| JP | 2001-184678 | 7/2001 |
| JP | 2005222654 A * | 8/2005 |

OTHER PUBLICATIONS

Machine-assisted translation and English abstract of JP 2005-222654 A.*

* cited by examiner

*Primary Examiner*—Andrea L Wellington
*Assistant Examiner*—Nathan Danielsen
(74) *Attorney, Agent, or Firm*—Antonelli, Terry, Stout & Kraus, LLP.

(57) ABSTRACT

In an optical disk apparatus, for reproducing information recorded on a recording surface of an optical disk, by setting such a focus condition that a tracking servo-error level comes to be maximum with a reflection light from the recording surface, while irradiating a light beam of a semiconductor laser, within a signal processor portion 300 for amplifying a RF signal reproduced from the optical disk is provided an equalizer 330 for lifting up high-frequency region of the RF signal, wherein an optimal control is made on an amount of lifting (i.e., EQ Boost Value) by the equalizer, depending upon a difference ($\Delta AF$) between a focus offset amount at which the RF signal reproduced comes to be maximum and a focus offset amount at which jitter of the RF signal reproduced come to be minimum.

9 Claims, 5 Drawing Sheets

| ΔAF | 6 step | 9 step | 12 step |
|---|---|---|---|
| EQ BOOST VALUE | + 3dB | + 6dB | + 9dB |

OPTICAL DISK APPARATUS WITH CONTROLLER FOR CHANGING AN AMOUNT OF LIFTING AND A CONTROL METHOD THEREOF

BACKGROUND OF THE INVENTION

The present invention relates to an optical disk apparatus for recording information onto an optical disk or reproducing the information recorded therefrom, and in particular, it relates to an optical disk apparatus enabling to maintain performances of recording/reproducing the information even with a pickup having aberration, and a control method thereof.

BRIEF SUMMARY OF THE INVENTION

Within an optical disk apparatus recording information on an optical disk, i.e., a disc-like recording medium, through irradiation of a laser beam, or reading out the information recorded thereon through converting a reflection light into electric signals, there is adopted a semiconductor laser light emitting element as a light generating source, in general. On the other hand, in recent years, a recoding medium having a large memory capacity, such as, a DVD (i.e., Digital Versatile Disc) representatively, for example, is proposed and is under the practical use thereof.

In particular, with a DVD-RAM (Digital Versatile Disc of Random Access Memory Type), although recording/reproduction of information is carried out by irradiating a focused laser beam upon a Land and a Groove having narrow width (for example, 0.6 μm), which are formed neighboring with each other on a surface of the optical disk, as being the recording medium; however, due to astigmatism of a lens building up an optical head, a focusing point at which a level of tracking-error signal reaches to the maximum is shifter into a defocusing direction, only with an ordinary focus control for bringing a RF signal to the maximum, and thereby lowering an allowable degree or margin of defocusing. Then, it is preferable to determine or set up the focus-servo so that the level of the tracking-error signal comes to the maximum, however a point where jitter of the RF signal falls down to the lowest (i.e., a best point of jitter: a jitter bottom) is shifted in the position from where the focus position where a level of the tracking-error signal reaches to the maximum, and it brings about a problem that a jitter margin comes to be small, as a result thereof.

However, for dissolving such problem mentioned above, as is known in the following Patent Document 1, for example, a proposal is made to provide an equalizer on an output side of the optical head, so that a high frequency region of the reproduced RF signal is lifted upward in the frequency characteristics by the equalizer, thereby letting the best point of tracking to be consistent with the jitter bottom by improving a MTE characteristics in appearance thereof, while at the same time achieving the focus control of brining up the tracking level at the best.

Also, for the purpose of controlling the focus position in the optical disk apparatus, but without being influenced by an environment where it is used, a control method is already known by the following Patent Document 2, wherein the focus position is determined or set up with using an amount or volume of jitters and/or that of data errors.

Patent Document 1: Japanese Patent Laying-Open No. Hei 5-62219 (1993); and

Patent Document 2: Japanese Patent Laying-Open No. 2001-62219 (2001).

However, with the Patent Document 1 mentioned above, there are discloses structures of the equalizer being constructed with a differential amplifier including a resistor and a capacitor for obtaining the equalizing under the focus condition when the tracking-error signal is at maximum in the level thereof; however, it still has the following problem.

Thus, with the Patent Document 1 mentioned above, the characteristics of the said equalizing is determined or set up by the resistance value and the capacity of the capacitor, as is shown in FIG. 2 thereof; however, in case when setting up the equalizing characteristics (i.e., an amount of lifting up the high frequency region of the reproduced RF signal) uniformly and unconditionally, in this manner, since the aberration of a lens differs from in the magnitude thereof, which irradiates a focused laser beam upon the optical disk within each pickup, even within the same kind or model of the products (i.e., the optical disk apparatuses), then it is difficult to make it equal to each other, and therefore each of the products has a luck of uniformity or in recording/reproducing capacities or performances due to the inherent or unique aberration of each of the pickups thereof. Also, in case when trying to set up the characteristics of said equalizing optimal for each of the products, it can be considered to make an adjustment on each product when it is shipped out; however, the works for doing this come to be very troublesome, and it brings about cost-up of the product.

For that reason, only with provision of the equalizer disclosed in the Patent Document 1 mentioned above, there is still a drawback that the RF signal cannot be obtained, always, being most suitable or optimal irrespective of the astigmatism of the lens. In particular, with such DVD-RAM enabling to record data on both the Land/Groove, it is difficult to guarantee the recording/reproducing performances, in particular, when the focus control position (or position) where the RF signal goes up to the maximum differs or shifts from the control position (or point) where the jitter falls down to the smallest, greatly (i.e., with the pickup having large astigmatism).

On the other hand, the Patent Document 2 mentioned above discloses therein a control method for setting up the focus position with using the jitter amount and/or the data error amount, so as to control the focus position without receiving the influences of the use environment thereof, etc., however as was mentioned in the above, there is no mentioning about a control method for working out a countermeasure in relation to a problem due to the fact, i.e., difference or shift is caused between the focus position where the level of tracking-error signal comes up to the maximum and the focus position where the reproduced RF signal comes up to the maximum. Thus, nothing is mentioned therein, about the equalizing for enlarging the defocus margin against lowering of signal quality within a product (i.e., the optical disk apparatus), which has a pickup being large in the astigmatism/spherical aberration.

Then, according to the present invention, accomplished by taking the problems in relation to the conventional arts mentioned above into the consideration thereof, an object thereof is to provide an optical disk apparatus and a control method thereof, for dissolving the ununiformity in the aberration of the lens, differing from for each product, by means of the equalizer, with certainty, irrespective of the aberration in the lens building up the pickup; i.e., enabling to determine or set up an amount of lifting-up within the high-frequency region of the RF signal, automatically and optimally, by means of the equalizer, thereby enabling to guarantee the preferable recording/reproducing performances with using the optical pickup having a large astigmatism, while achieving preferable focus control by means of the equalizer mentioned above.

Further, the inventor of the present invention finds that the difference in the defocus direction between the focus control point (i.e., the focus offset amount) where the RF signal comes up to the maximum and the focus control point (i.e., the focus offset amount) where the jitter comes down to the minimum can be determined by an magnitude of the aberration of a lens, which builds up the pickup, and the present invention is accomplished upon basis of such the knowledge or finding of the present inventor.

For accomplishing the object mentioned above, according to the present invention, first there is provided an optical disk apparatus, comprising: a motor for driving an optical disk at a predetermined rotation speed; an optical pickup for irradiating a light beam of a semiconductor laser upon a recording surface of the optical disk rotationally driven by said motor, and for producing a RF signal upon receipt of a reflection light from said recording surface; a controller for controlling a focus condition of said optical pickup upon basis of said electrical signal produced, so that a tracking servo-error level comes to be maximum; a signal processor portion for amplifying the RF signal reproduced from said optical disk; and an equalizer being provided in a part of said signal processor portion, for lifting up high-frequency signals of said RF signal by a predetermined level, wherein said controller changes an amount of lifting by means of said equalizer depending upon difference between a focus offset amount at which said RF signal reproduced comes to be maximum and a focus offset amount at which jitter of said RF signal reproduced come to be minimum.

Further, according to the present invention, preferably, the optical disk apparatus as described in the above, further comprises a first detect portion for detecting the focus offset amount at which the RF signal reproduced come to be maximum, and a second detect portion for detecting the focus offset amount at which the jitter of the RF signal reproduced comes to be minimum, wherein said controller controls an amount of lifting of high-frequency region of the RF signal by means of said equalizer depending upon difference between the focus offset amounts detected by said two (2) detect portions, and further, it comprises a comparison portion for comparing the difference between the focus offset amounts detected by said two (2) detect portions, wherein said controller controls the amount of lifting by means of said equalizer upon basis of a comparison result obtained by said comparison portion. Also, according to the present invention, within the optical disk apparatus as described in the above, preferably, said threshold values are provided in plural number thereof, and the difference of the focus offset amounts is compared with said plural number of threshold values, thereby bringing the amount of lifting by means of said equalizer to be different corresponding to said plural number of threshold values, and in such case, preferably, the amounts of lifting by means of said equalizer are prepared in advance corresponding to said plural number of threshold values, to be provided in form of a table.

In addition thereto, according to the present invention, also for accomplishing the object mentioned above, there is further provided a control method of an optical disk apparatus for reproducing information recorded on a recording surface of an optical disk, at least having a signal processor portion for amplifying a RF signal reproduced from said optical disk, and an equalizer provided within said signal processor portion for lifting up high-frequency region of the RF signal, comprising the following steps of: irradiating a light beam of a semiconductor laser upon the recording surface of said optical disk; setting up such a focus condition that a tracking servo-error level obtained from a reflection light upon the recording surface of said optical disk; and changing an amount of lifting by means of said equalizer depending upon difference between a focus offset amount at which said RF signal reproduced comes to be maximum and a focus offset amount at which jitter of said RF signal reproduced come to be minimum.

Further, according to the present invention, preferably, the control method of an optical disk apparatus as described in the above, further comprises a step of comparing a difference between the focus offset amount at which the RF signal reproduced come to be maximum and the focus offset amount at which the jitter of the RF signal reproduced comes to be minimum, thereby determining on whether the lifting by means of said equalizer be made or not, depending upon a result of said comparison, and further, within the control method as described in the above, preferably, said threshold values are provided in plural number thereof, and an amount of lifting by means of said equalizer is determined upon results of comparisons of the difference between the focus offset amount at which the RF signal reproduced come to be maximum and the focus offset amount at which the jitter of the RF signal reproduced comes to be minimum, with those plural number of threshold values. And, with control method of an optical disk apparatus, preferably, said control method is executed, at least when said optical disk apparatus starts operation thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 2:
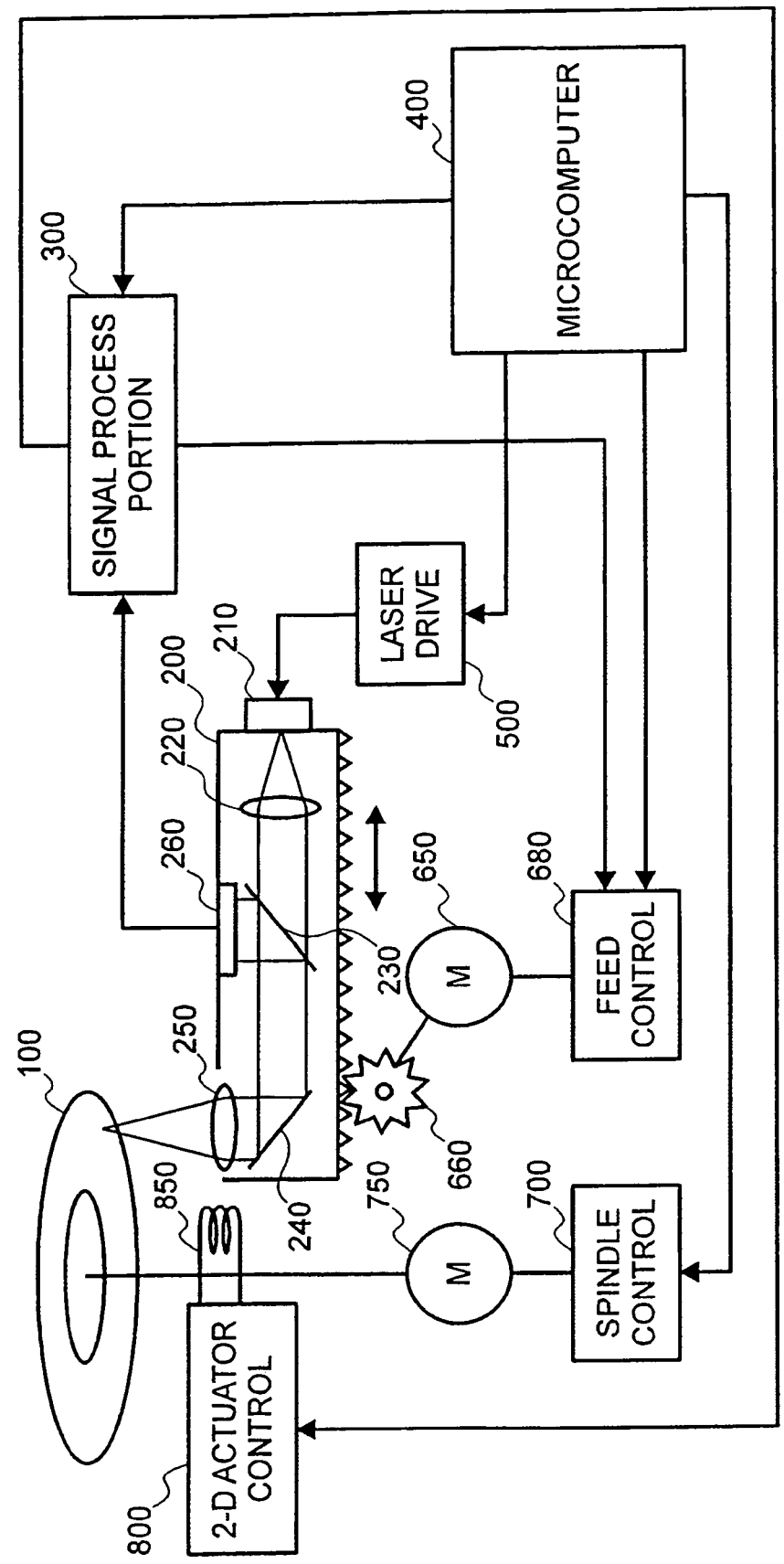
FIG. 2 is a block diagram for showing the entire structures of the optical disk apparatus, according to the embodiment of the present invention.

FIG. 2 attached herewith is a block diagram for showing the entire structures of an optical disk apparatus, according to an embodiment of the present invention, and in this FIG. 2, a reference numeral 100 depicts an optical disk of a high-density information recording medium. Also, a reference numeral 200 therein depicts an optical pickup, as being an optical reproducing means, comprising therein: a semiconductor laser 210, as a light generating element for generating laser lights of a desired wavelength; a collimate lens 220 for guiding the laser lights into a parallel light; a half-mirror 230 for guiding an incident light onto a mirror and guiding a reflection light onto a light receiving element, which will be mentioned later; a mirror 240 for changing the direction of light; an objective lens 250 for focusing or converging the laser light into a predetermined diameter of beam to be irradiated on a recording surface of the optical disk 100 mentioned above; and a light receiving element 260 for receiving the reflection light from the half-mirror 230 to detect, etc.

Herein, for changing the focus distance thereof fitting to the thickness of the optical disk 100, the objective lens 250 is made up with two (2) pieces of objective lenses, i.e., one for use of DVD and the other for use of CD. This pair of the two (2) pieces of objective lenses 250 can be exchanged by a mechanism of moving them swiftly or quickly in the horizontal direction. In case where tracking servo operates normally, since the optimal position includes a stable point, then the lens can be moved in the horizontal direction, instantaneously, to be received into a stable point of tracking for the other lens, if applying a kicking pulse signal to the tracking control system when moving the lens. However, the structures of the objective lens should not be restricted to that mentioned above, but for example, technically it is possible to adopt only one (1) piece of an objective lens for both, i.e., for DVD-use and CD-use, commonly.

Also, in FIG. 2 mentioned above, a reference numeral 300 depicts a signal processor portion for converting the reflection lights, which are detected by the light receiving element 260 of the optical reproducing means mentioned above, into electric signals, so as to treat a predetermined processing thereupon. This signal processor portion 300 is connected with a microcomputer 400, which is provided for executing the control upon the optical disk apparatus, as a whole, and it carries out various controls, including the focus control method, which will be mentioned in details thereof, below. Thus, this microcomputer 400 is connected with a laser driver portion 500, a feed control portion 600, a spindle control portion 700, and a two-dimension (2-D) actuator control circuit 800, for achieving the various controls therewith.

Namely, with such the structures mentioned above, the microcomputer 400 makes control upon the intensity of light emission through controlling current supplied to the semiconductor laser 210, as the light emission element of the pickup 200, i.e., the optical reproducing means mentioned above, and also controls the rotation of a motor 650 for use of feed control; thereby controlling the position of the optical pickup 200 in the radial direction of the optical disk 100. As a moving or transferring mechanism into the radial direction of the optical disk 100, in this embodiment, it is presented by a gear 660 for moving or transferring the optical pickup 200 in the radial direction through rotation of the motor 650 for use of feed control. However, according to the present invention, it should not be limited only to this.

Also, the microcomputer 400 controls rotation of the motor 750 for rotationally driving a spindle; thereby achieving control for maintaining a constant liner velocity, which is widely adopted in such high-density information recording medium, i.e., CLV (i.e., Constant Linear Velocity) or ZCLV (i.e., Zoned Constant Linear Velocity), etc. Further, this microcomputer 400 achieves the focus position control of the objective lens 250 within the optical pickup 200, through the 2-D actuator control circuit 800, for example, by means of an electromagnetic operation with using an electromagnetic coil 850 or the like, as a functioning means thereof. However, herein as two-dimensional position control achieved by that 2-D actuator control circuit 800, in addition to the position control of the objective lens 250 in the direction perpendicular to the recording surface of the optical disk 100, there is further included a tracking position control for following the track with a minute position adjustment into the radial direction perpendicular thereto, and further the exchange control of the two (2) pieces of optical condenser lenses mentioned above.

Then, with such the optical apparatus as was mentioned above, instructions or information data from a host (i.e., an outer equipment), such as, a personal computer not shown in the figure, for example, is interpreted through an interface control circuit (not shown in the figure), thereby executing the recording and reproducing of information and seek operation, etc., under the control of the microcomputer 400. Also, signal conversion is made within the signal processor portion 300, so that it is possible to record information onto the optical disk 100 through the optical pickup 200, or to demodulate various kinds of signals, which are read in through the light receiving element 260, into original data within the signal processor portion 300. However, detailed explanation about the recording/reproducing operations of information will be omitted herewith.

Also, upon the recording/reproducing mentioned above, various kinds of control information recorded on the optical disk 100 are produced within the signal processor portion 300, to be used as the control signals for various kinds of devices mentioned above.

Figure 1:
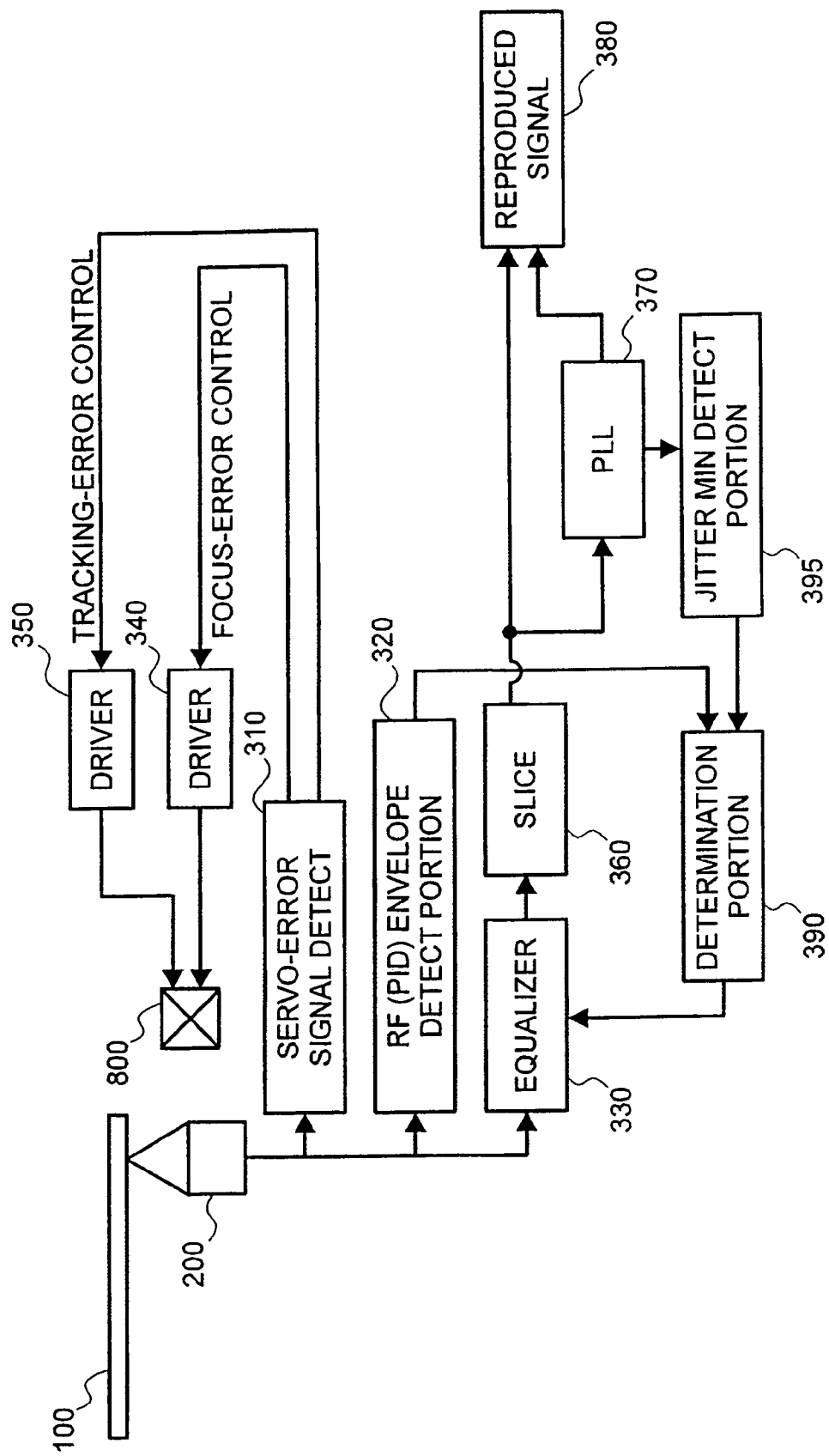
FIG. 1 is a block diagram for showing the distinctive feature of the present invention, i.e., a signal processor portion, according to an embodiment of the present invention.

Next, among the entire structures of the optical disk apparatus mentioned above, details of the distinctive portion (in particular, the signal processor portion 300 in FIG. 2 above), according to the present invention, will be explained by referring to FIG. 1 attached herewith. As apparent from the figure, this signal processor portion comprises: a servo-error signal detect circuit 310 for picking up a tracking servo-error signal (i.e., a focus-error signal and a tracking-error signal) from the electric signals from the optical pickup 200 mentioned above (in more details, output signals from the above light receiving element 260); an envelope detect circuit 320 for detecting an envelope of the RF signal from the electric signals mentioned above; and further an equalizer 330 for lifting up the high-frequency region of the reproduced RF signal, with respect to the RF signal which is picked up from the electric signals, thereby achieving such the focus control that the tracking level comes to be optimal. Further, this equalizer 330 can change (i.e., control) the level of the reproduced RF signal at high-frequency region to be lifted up (i.e., an amplification factor at the high-frequency region), through the control signal provided at the control terminal thereof.

Also, as apparent from the figure, upon basis of the servo-error signal, the focus-error signal and the tracking-error signal from the servo-error signal detector circuit 310, the actuator 800 of the optical pickup 200 is driven/controlled through drivers 340 and 350 thereof, respectively. Thus, this achieves the focus-error control and the tracking-error control.

And, the RF signal, which is lifted up in the high-frequency region thereof by the equalizer 330 mentioned above is converted into a digitized signal within the slice circuit 360, through comparison with a predetermined slice level, at the same time, being detected with a clock signal thereof through a PLL circuit 370, and thereafter, the digital signal is processed to be reproduced within a reproduced signal circuit 380. And, according to the present invention, at the control terminal of the equalizer 330 is provided a determination portion 390, and further at two (2) pieces of input terminals of the determination portion 390 are provided an output from the envelope detect circuit 320 and a jitter minimum value detect circuit 395 for detecting the minimum value of jitter (i.e., the best jitter) while receiving the clock signal extracted within the PLL circuit 370 mentioned above, respectively.

Thus, the present inventor finds out that the difference in the defocus direction between the focus control point (i.e., the focus offset amount) where the RF signal comes up to the maximum and the control point (i.e., the focus offset amount) where the jitter comes down to the minimum can be determined by an magnitude of the aberration of a lens, which builds up the pickup, and then achieved the optical disk apparatus enabling to maintain the recording/reproducing performances at the optimum with the optical pickup having the large astigmatism (or different in the astigmatism), with utilizing such the phenomenon therein; i.e., through conducting a learning at the time when the optical disk apparatus starts the operation thereof.

Figure 4A:
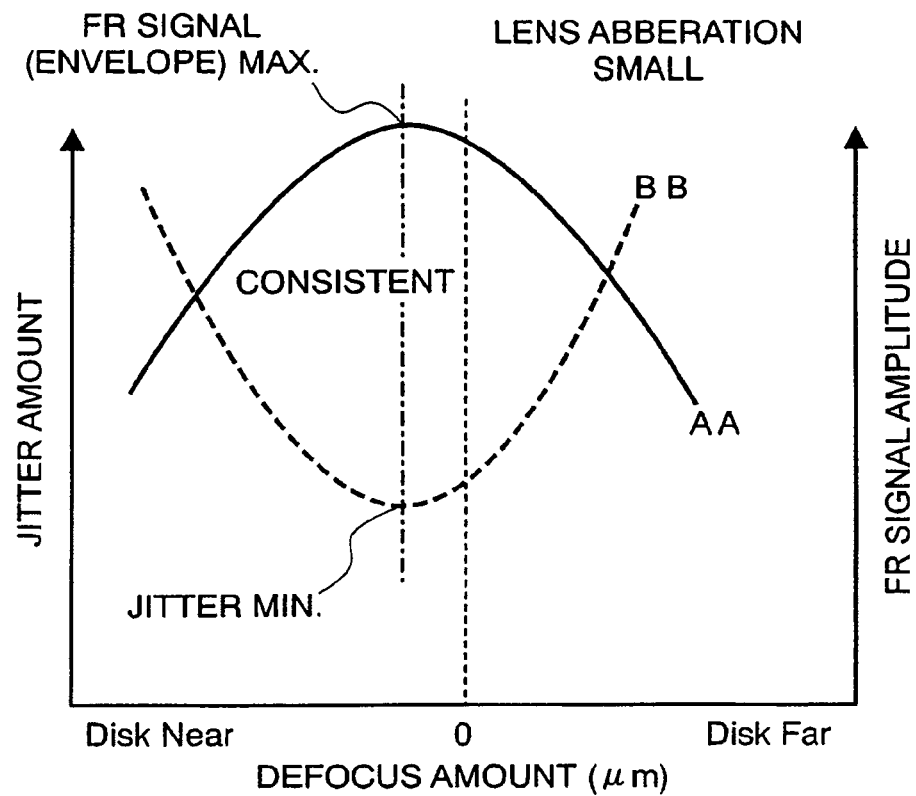
FIGS. 4(A) and 4(B) are graphs for showing characteristics of a level of RF signal and a jitter amount with respect to a defocus amount, in both cases where the aberration of a les is small and large.

In more details, as is shown in FIG. 4(A), in case where the aberration of a lens is zero (0) or small, in general, a level of the RF signal reproduced shows such a characteristic, as shown by a curve "AA" in the figure, with respect to the defocus amount shown on the horizontal axis in the figure (=focus offset amount: assuming that the center thereof is the position (0) where the RF signal comes up to the maximum), on the other hand, the jitter amount at that time shows such a characteristic, as shown by a curve "BB". In other words, the focus control point where the RF signal comes up to the maximum and the control point where the jitter comes down to the minimum are almost consistent with, at a position of the defocus amount shown on the horizontal axis in the figure.

Figure 4B:
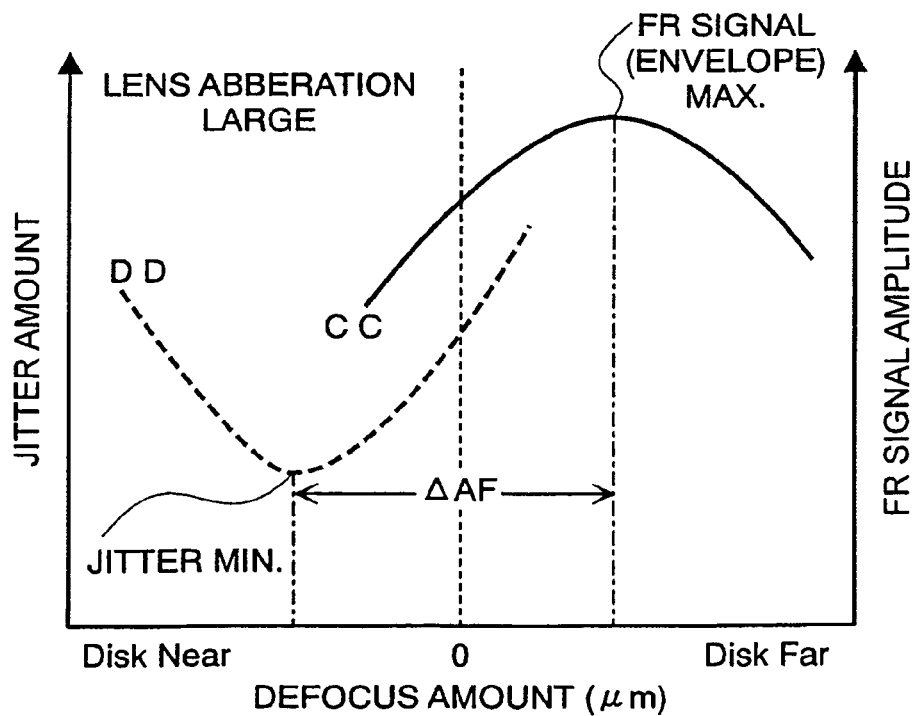

On the contrary to this, in case where the aberration of a lens is large, the level of the RF signal shows such a characteristic, as shown by a curve "CC" in FIG. 4(B), on the other hand, the jitter amount at that time shows such a characteristic, as shown by a curve "DD". In other words, in case where the aberration of the lens is large, the focus control point where the RF signal comes up to the maximum and the control point where the jitter comes down to the minimum differ from each other, largely. Then, according to the present embodiment, first of all, the difference in the defocus amount (i.e., "ΔAF") is obtained between the focus control point where the RF signal comes up to the maximum and the control point where the jitter comes down to the minimum, and upon basis of this difference obtained, automatically determined or set up the level of the RF signal (="EQ Boost Value") to be lifted up in the high-frequency region thereof by means of the equalizer 330, at an optimal value thereof, appropriately (see FIG. 5).

Following to the above, detailed explanation will be given on the operations of the optical disk apparatus according to the present invention, in particular, mainly around the signal processor portion 300 shown in FIG. 1 mentioned above, by referring to a flowchart shown in FIG. 3 attached herewith, within the entire structures of the optical disk apparatus as was explained in the above. However, the operations shown by the following flow are executed by means of the microcomputer 400 shown in FIG. 2, for example, when the optical disk apparatus starts the operation thereof.

Figure 3:
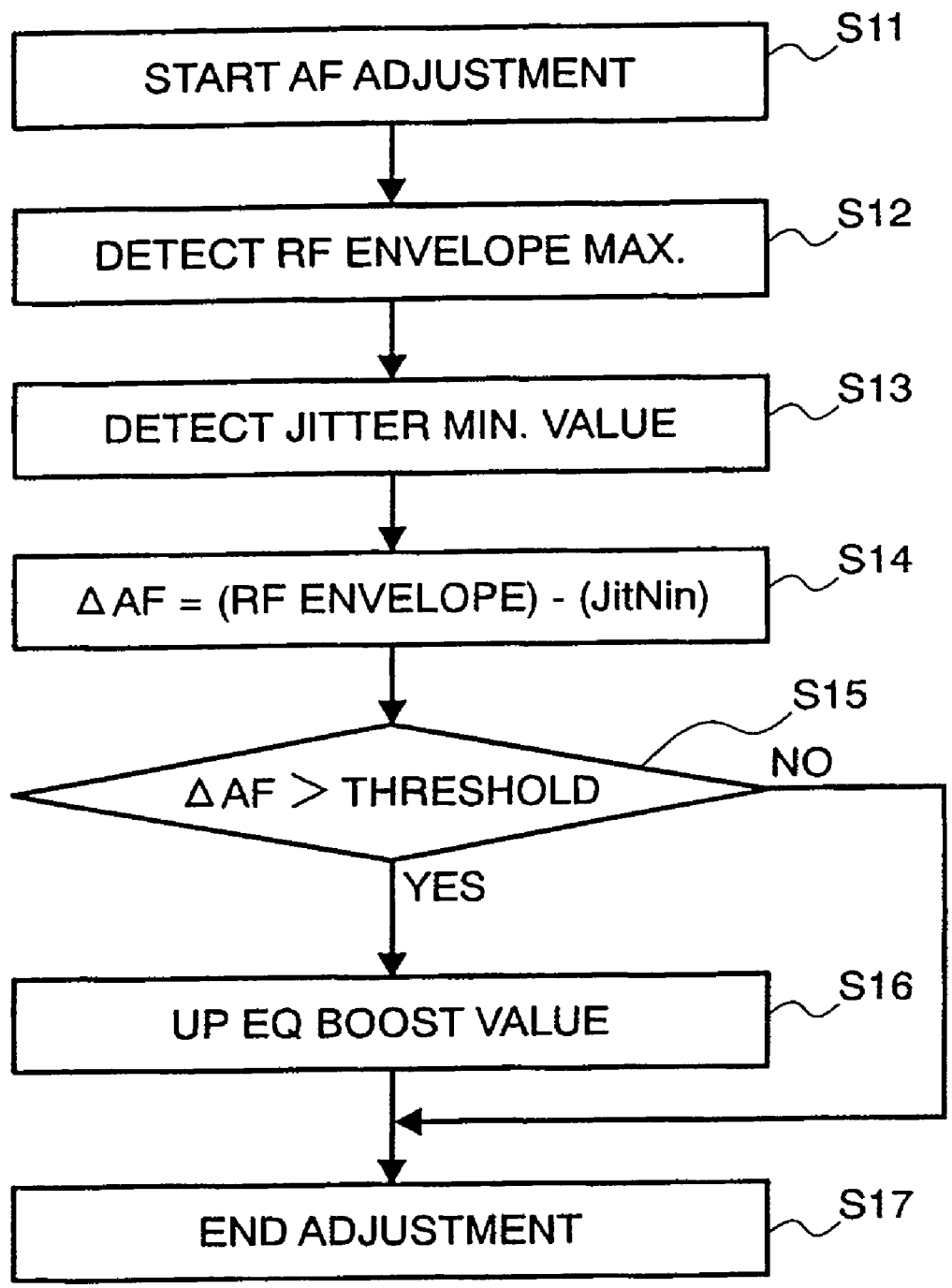
FIG. 3 is a flowchart for showing an example of algorithm for determining an equalizer level within the optical disk apparatus mentioned above.

First, when the optical disk apparatus is initiated, for example, following the flow shown in FIG. 3, an algorithm is started for determining an equalizer level. Thus, inserting a disk, i.e., the information recording medium, into a drive (i.e., the optical disk apparatus), control is made upon the pickup 200, with using the servo-error signal obtained from the pickup portion.

In more details thereof, as is apparent from the figure, AF adjustment (i.e., focus adjustment) is started, while using a PID portion of the disk, through the servo-error signal detect circuit 310 (step S11). Thereafter, the maximum value of envelope of the RF signal by means of the envelope detect signal 320 (step S12). Thus, detection of the maximum value on envelope of this RF signal, it is possible to obtain the focus offset value (=focus control point at which the RF signal comes to the maximum="RF Env") at that time.

Following to the above, an adjustment is made so that the jitter comes down to the minimum, and the minimum value of the jitter is detected by means of the jitter minimum value detect circuit 395 mentioned above (step S13). Further, at that time, the focus offset value or amount (=the control point where the jitter comes down to the minimum="JitMin") can be obtained, in the similar manner.

Next, the difference "ΔAF" is obtained between the "RF Env", the focus offset amount obtained in the above and "JitMin" (step S14). Thus, since an amount of aberration of the lens building up the pickup for the optical disk apparatus can be obtained from "ΔAF", which is obtained through this process, determination or set-up is made upon an amplification level for the RF signal to be lifted up within the high-frequency region by the equalizer 330, appropriately. However, in the present example, this "ΔAF" is compared with a predetermined threshold value (step S15), and as a result thereof, if being determined that it is larger than the said threshold value ("Yes"), the amplification level (="EQ Boost Value") presently set-up of the equalizer is elevated or shifted upwards, and thereby completing the adjusting operation. On the other hand, if being determined that it is equal or smaller than the threshold value ("No"), then the adjusting operation is finished while keeping the present amplification level (="EQ Boost Value") of the equalizer presently set-up as it is. However, in this instance, that value may be stored as "AF_JIT" into a memory, so as to use it as the "EQ Boost Value" in the operation thereafter.

Figures 5, 6:
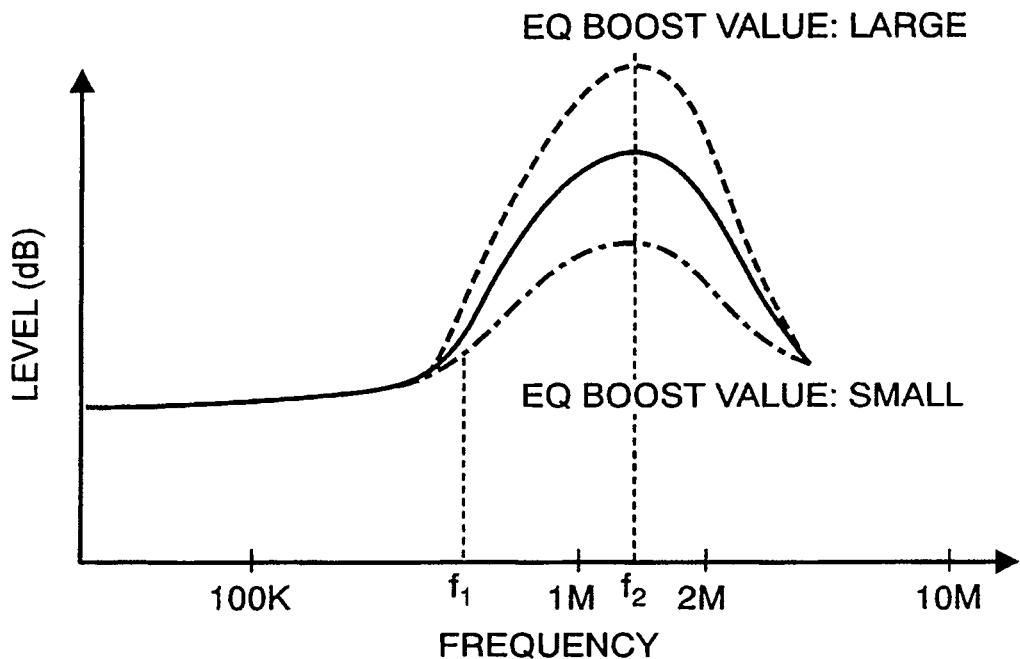
FIG. 5 is a view for explaining the level of RF signal, which is lifted up at high-frequency region thereof by means of an equalizer.
FIG. 6 is a view for showing an example of the contents of a table of threshold values and WQ boost levels, which is prepared within an inside of a memory device (for example, RAM, etc.) building up a microcomputer in the present embodiment.

However, in actual, for example, as is shown in FIG. 6 attached herewith, it is preferable that, for example, within the memory device (such as, RAM or the like) building up the microcomputer 400 is prepared a table, while setting a plural number of thresholds differing in the values thereof and also obtaining the amplification levels (="EQ Boost Values"), i.e., the lift-up amount by means of the equalizer, corresponding to those values, respectively, and setup is made at the "EQ Boost Value" provided, finely, by using that table. Or, alternately, in the flow shown in FIG. 3 mentioned above, it is possible to make setup at the "EQ Boost Value", which is preset finely.

In addition thereto, in case where the disk inserted into the apparatus is the DVD disk, it is preferable to conduct the control mentioned above upon both the land and the groove. Although the explanation was made that the control mentioned above is executed when the optical disk apparatus is started up, in the present embodiment; however, according to the present invention, it should not be restricted only to that, but it apparent for the person skilled in the art that it may be executed at other timing than that.

As was fully mentioned above, according to the present invention, it is possible to provide the optical disk apparatus and the control method thereof, for dissolving the ununiformity in the aberration of the lens, differing from for each product, by means of the equalizer, with certainty, irrespective of the aberration in the lens building up the pickup; i.e., enabling to determine or set up an amount of lifting-up within the high-frequency region of the RF signal, automatically and optimally, by means of the equalizer, thereby enabling to guarantee the preferable recording/reproducing performances with using the optical pickup having a large astigmatism, while achieving preferable focus control by means of the equalizer mentioned above.

The present invention maybe embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk apparatus, comprising:
   a motor for driving an optical disk at a predetermined rotation speed;
   an optical pickup for irradiating a light beam of a semiconductor laser upon a recording surface of the optical disk rotationally driven by said motor, and for producing a RF signal upon receipt of a reflection light from said recording surface;
   a controller for controlling a focus condition of said optical pickup upon basis of said electrical signal produced, so that a tracking servo-error level comes to be maximum;
   a signal processor portion for amplifying the RF signal reproduced from said optical disk; and
   an equalizer being provided in a part of said signal processor portion, for lifting up high-frequency signals of said RF signal by a predetermined level, wherein
   said controller changes an amount of lifting by means of said equalizer depending upon a difference between a focus offset amount at which said RF signal reproduced comes to be maximum and a focus offset amount at which jitter of said RF signal reproduced come to be minimum.

2. The optical disk apparatus, as described in the claim 1, further comprising a first detect portion for detecting the focus offset amount at which the RF signal reproduced comes to be the maximum, and a second detect portion for detecting the focus offset amount at which the jitter of the RF signal reproduced comes to be the minimum, wherein said controller controls the amount of lifting of a high-frequency region of the RF signal by means of said equalizer depending upon a difference between the focus offset amounts detected by said first and second detect portions.

3. The optical disk apparatus, as described in the claim 2, further comprising a comparison portion for comparing the difference between the focus offset amounts detected by said first and second detect portions with at least one threshold value, wherein said controller controls the amount of lifting by means of said equalizer upon basis of a comparison result obtained by said comparison portion.

4. The optical disk apparatus, as described in the claim 3, wherein said at least one threshold value includes a plurality of threshold values, and the difference of the focus offset amounts is compared with said plurality threshold values, thereby bringing amounts of lifting by means of said equalizer to be different corresponding to said plurality of threshold values.

5. The optical disk apparatus, as described in the claim 4, wherein the amounts of lifting by means of said equalizer are prepared in advance corresponding to said plurality of threshold values which are provided in a form of a table.

6. A control method of an optical disk apparatus for reproducing information recorded on a recording surface of an optical disk, at least having a signal processor portion for amplifying a RF signal reproduced from said optical disk, and an equalizer provided within said signal processor portion for lifting up a high-frequency region of the RF signal, comprising the following steps of:
   irradiating a light beam of a semiconductor laser upon the recording surface of said optical disk;
   setting up such a focus condition that a tracking servo-error level obtained from a reflection light upon the recording surface of said optical disk comes to be maximum; and
   changing an amount of lifting by means of said equalizer depending upon a difference between a focus offset amount at which said RF signal reproduced comes to be maximum and a focus offset amount at which jitter of said RF signal reproduced come to be minimum.

7. The control method of an optical disk apparatus, as described in the claim 6, further comprising a step of comparing the difference between the focus offset amount at which the RF signal reproduced come to be maximum and the focus offset amount at which the jitter of the RF signal reproduced comes to be minimum with at least one threshold value, thereby determining whether the lifting by means of said equalizer be made or not, depending upon a result of said comparison.

8. The control method of an optical disk apparatus, as described in the claim 7, wherein said at least one threshold value includes a plurality of threshold values, and the amount of lifting by means of said equalizer is determined upon results of comparisons of the difference between the focus offset amount at which the RF signal reproduced come to be maximum and the focus offset amount at which the jitter of the RF signal reproduced comes to be minimum, with said plurality of threshold values.

9. The control method of an optical disk apparatus, as described in the claim 6, wherein said control method is executed, at least when said optical disk apparatus starts operation thereof.

* * * * *